(12) United States Patent
Wong et al.

(10) Patent No.: US 11,979,241 B2
(45) Date of Patent: May 7, 2024

(54) METHODS, TERMINAL DEVICE AND INFRASTRUCTURE EQUIPMENT USING TRANSMISSION ON A PRECONFIGURED UPLINK RESOURCE

(71) Applicant: Sony Corporation, Tokyo (JP)

(72) Inventors: Shin Horng Wong, Basingstoke (GB);
Martin Warwick Beale, Basingstoke (GB)

(73) Assignee: Sony Corporation, Tokyo (JP)

( * ) Notice: Subject to any disclaimer, the term of this patent is extended or adjusted under 35 U.S.C. 154(b) by 547 days.

(21) Appl. No.: 17/276,163

(22) PCT Filed: Sep. 26, 2019

(86) PCT No.: PCT/EP2019/076081
§ 371 (c)(1),
(2) Date: Mar. 15, 2021

(87) PCT Pub. No.: WO2020/064950
PCT Pub. Date: Apr. 2, 2020

(65) Prior Publication Data
US 2022/0038221 A1 Feb. 3, 2022

(30) Foreign Application Priority Data
Sep. 28, 2018 (EP) .................................. 18197765

(51) Int. Cl.
*H04L 1/1829* (2023.01)
*H04L 1/00* (2006.01)
*H04W 72/23* (2023.01)

(52) U.S. Cl.
CPC .......... *H04L 1/1861* (2013.01); *H04L 1/0061* (2013.01); *H04W 72/23* (2023.01)

(58) Field of Classification Search
CPC .... H04L 1/1861; H04L 1/0061; H04W 72/23; H04W 72/1268
(Continued)

(56) References Cited

U.S. PATENT DOCUMENTS

| | | |
|---|---|---|
| 2018/0191478 A1 | 7/2018 | Uhling et al. |
| 2018/0242356 A1 | 8/2018 | Wu et al. |

(Continued)

FOREIGN PATENT DOCUMENTS

| | | | | |
|---|---|---|---|---|
| WO | WO-2019080555 A1 | * | 5/2019 | ............ H04W 48/08 |
| WO | 2020/030741 A1 | | 2/2020 | |

OTHER PUBLICATIONS

International Search Report and Written Opinion mailed on Dec. 3, 2019, received for PCT Application PCT PCT/EP2019/076081 Filed on Sep. 26, 2019, 12 pages.

(Continued)

*Primary Examiner* — Rownak Islam
(74) *Attorney, Agent, or Firm* — XSENSUS LLP

(57) ABSTRACT

A terminal device comprising: transmitter circuitry configured to transmit a signal to infrastructure equipment of a wireless telecommunications network using a predetermined set of radio resources configured for use by a plurality of unidentified terminal devices; receiver circuitry configured to receive, from the infrastructure equipment, at least one of: a positive response signal indicating that the signal transmitted to the infrastructure equipment was successfully received by the infrastructure equipment and that the identifying feature of the terminal device was successfully determined by the infrastructure equipment using the signal transmitted to the infrastructure equipment; and a negative response signal indicating that the signal transmitted to the infrastructure equipment was not successfully received by the infrastructure equipment or that the identifying feature of (Continued)

the terminal device was not successfully determined by the infrastructure equipment using the signal transmitted to the infrastructure equipment.

19 Claims, 8 Drawing Sheets

(58) Field of Classification Search
USPC .......................................................... 370/330
See application file for complete search history.

(56) References Cited

U.S. PATENT DOCUMENTS

| | | | |
|---|---|---|---|
| 2018/0254879 A1* | 9/2018 | Loehr | H04L 5/0057 |
| 2019/0268104 A1* | 8/2019 | Zou | H04L 1/1887 |
| 2019/0312596 A1* | 10/2019 | Curkste | H03M 13/6306 |
| 2021/0242980 A1* | 8/2021 | Zhang | H04L 1/1887 |
| 2021/0298108 A1* | 9/2021 | Wu | H04W 56/0045 |

OTHER PUBLICATIONS

Ericsson, "Revised WID for Further Enhanced MTC for LTE", 3GPP TSG RAN Meeting #73, RP-161464, Sep. 19-22, 2016, 6 pages.

Huawei et al., "Revised Work Item Proposal: Enhancements of NB-Iot", 3GPP TSG RAN Meeting #73, RP-161901, Sep. 19-22, 2016, 8 pages.

Ericsson et al., "New WID on Even Further Enhanced MTC for LTE", 3GPP TSG RAN Meeting #75, RP-170732, Mar. 6-9, 2017, 4 pages.

Huawei et al., "New WID on Further NB-IoT Enhancements", 3GPP TSG RAN Meeting #75, RP-170852, Mar. 6-9, 2017, 6 pages.

Ericsson, "New WID on Rel-16 MTC enhancements for LTE", 3GPP TSG RAN Meeting #80, RP-181450, Jun. 11-14, 2018, 4 pages.

Ericsson et al., "New WID on Rel-16 Enhancements for NB-IoT", 3GPP TSG RAN Meeting #80, RP-181451, Jun. 11-14, 2018, 4 pages.

Holma et al., "LTE for UMTS OFDMA and SC-FDMA Based Radio Access", John Wiley and Sons, 2009, pp. 25-27.

3GPP, "Evolved Universal Terrestrial Radio Access (E-UTRA); Multiplexing and Channel Coding (Release 15)", TS 36.212 v15.2.1, Jul. 2018, pp. 1-245.

Interdigital Communications, "Considerations on UL Grant-Free Transmissions for mMTC" 3GPP TSG RAN WG1 Meeting #86bis, R1-1609893, Oct. 10-14, 2016, pp. 1-3.

Nokia et al., "UE Identification and HARQ for URLLC UL Grant-Free", 3GPP TSG-RAN WG1 Ad-Hoc NR#2, R1-1710994, Jun. 27-30, 2017, 5 pages.

LG Electronics, "Discussion on Grant-Free Uplink Transmission", 3GPP TSG RAN WG1 Meeting #89, R1-1707655, May 14-19, 2017, 9 pages.

Nokia et al., "Transmission in Preconfigured UL Resources", 3GPP TSG RAN WG1 Meeting #94, R1-1808431, Aug. 20-24, 2018, 4 pages.

Samsung, "Retransmission Scheme for Contention Based Access", 3GPP TSG-RAN2#69bis meeting, R2-102461, Apr. 12-16, 2010, pp. 1-2.

* cited by examiner

METHODS, TERMINAL DEVICE AND INFRASTRUCTURE EQUIPMENT USING TRANSMISSION ON A PRECONFIGURED UPLINK RESOURCE

CROSS-REFERENCE TO RELATED APPLICATIONS

The present application is based on PCT filing PCT/EP2019/076081, filed Sep. 26, 2019, which claims priority to EP 18197765.3, filed Sep. 28, 2018, the entire contents of each are incorporated herein by reference.

BACKGROUND

Field of Disclosure

The present disclosure relates to methods, a terminal device and infrastructure equipment for a wireless telecommunications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. The IoT is further enhanced in 3GPP by the introduction of two additional Release 16 Work Items, namely A-MTC (Additional Machine Type Communications Enhancements) [5] and A-NB-IoT (Additional Enhancement for Narrowband Internet of Things) [6].

At least some devices making use of these technologies are expected to be low complexity and inexpensive devices requiring relatively infrequent communication of relatively low bandwidth data. The increasing use of different types of terminal devices associated with different traffic profiles gives rise to new challenges for efficiently handling communications in wireless telecommunications systems that need to be addressed.

SUMMARY OF THE DISCLOSURE

The present technique is defined by the claims.

It is to be understood that the following detailed description is exemplary, but is not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
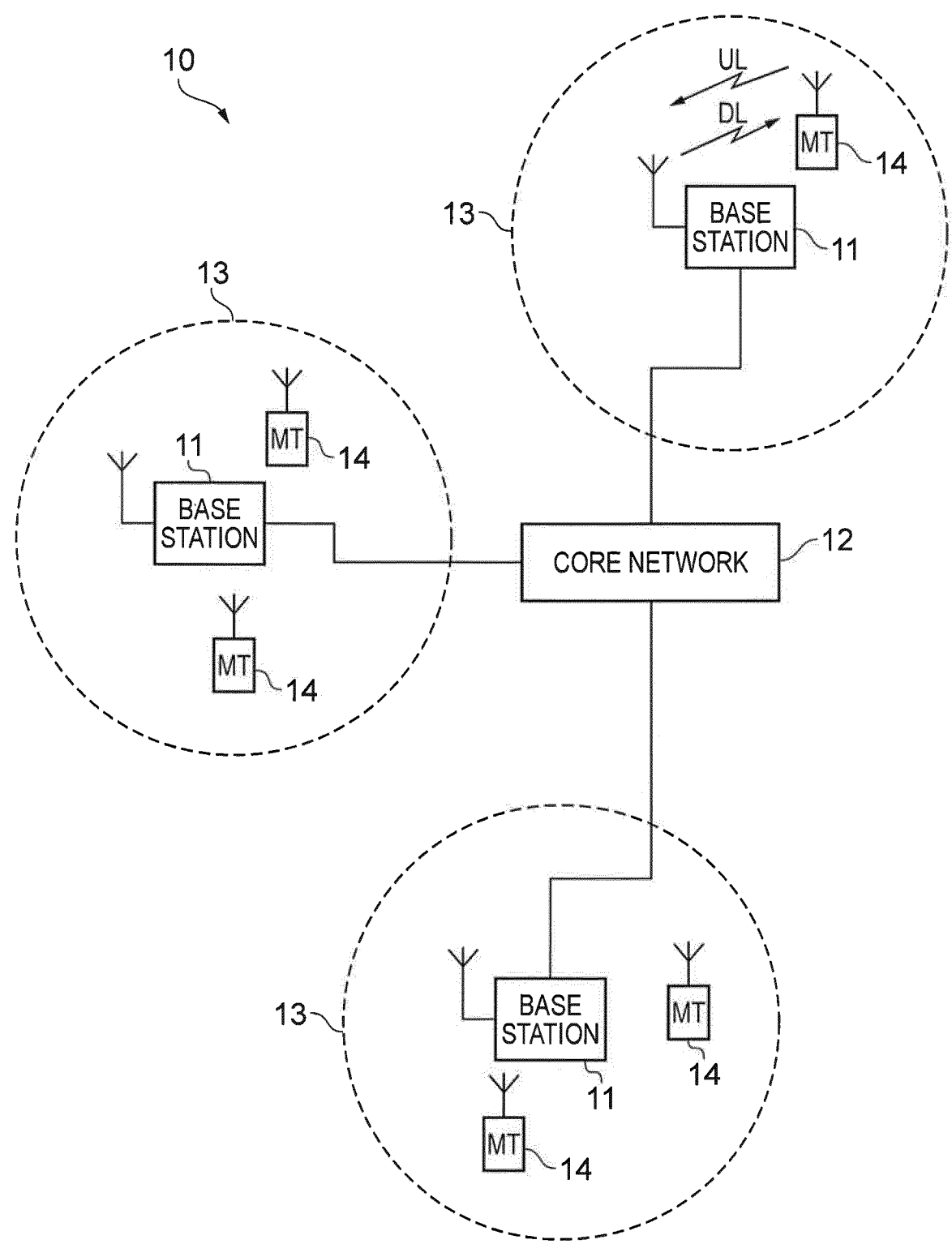
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [7]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [3]

eMBB services are characterised by high capacity with a requirement to support up to 20 Gb/s. The requirement for URLLC is a reliability of $1\text{-}10^{-5}$ (99.999%) for one transmission of a relatively short packet such as 32 bytes with a user plane latency of 1 ms [4].

The elements of the wireless access network shown in FIG. 1 may be equally applied to a 5G new RAT configuration, except that a change in terminology may be applied as mentioned above.

Figure 2:
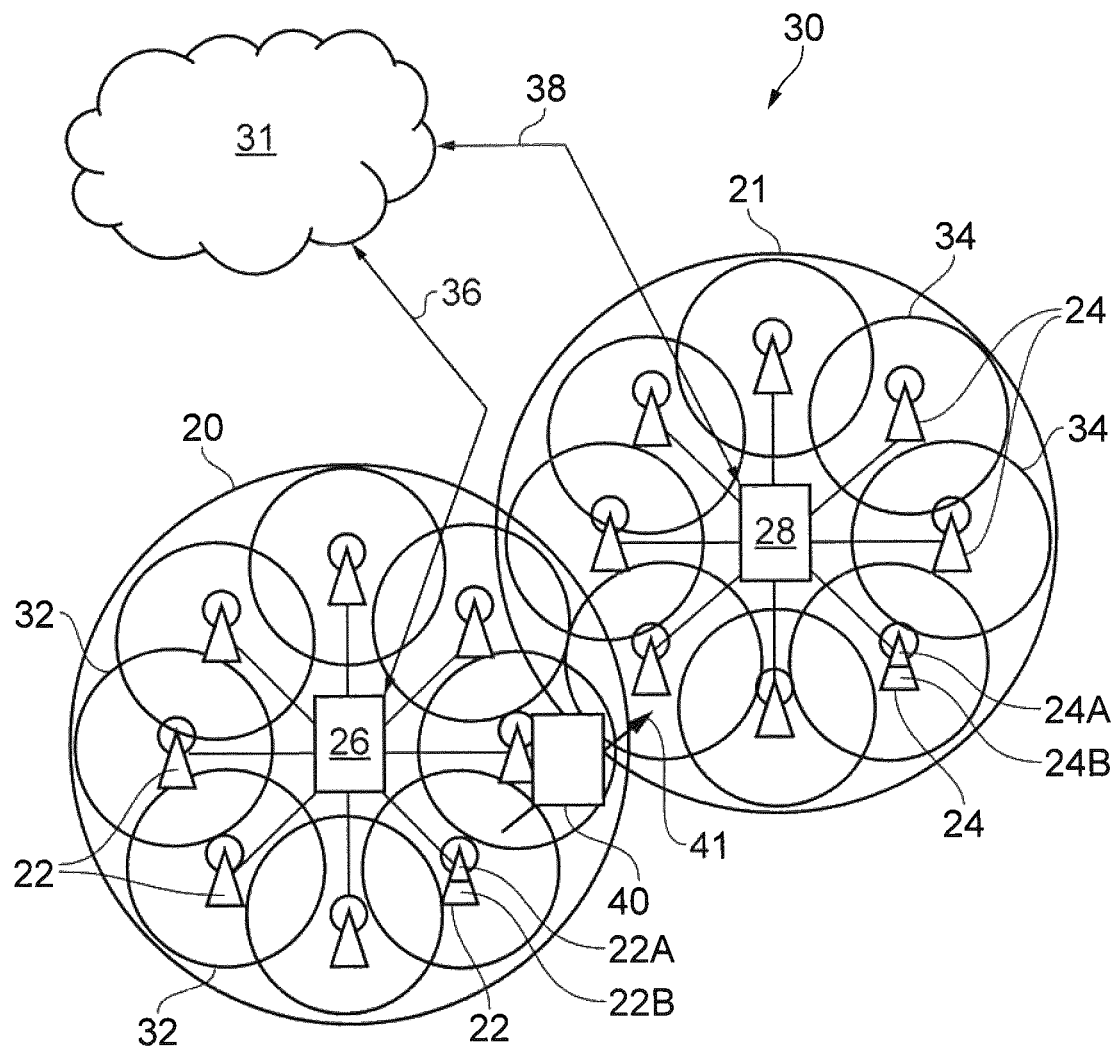
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/ remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 in a cell has a coverage area (radio access footprint) 32, 34, where the aggregation of the coverage areas of the distributed units 22, 24 defines the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Random Access (RACH) Procedure and Early Data Transmission (EDT)

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may move to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in RRC idle mode to exchange data with a network involves the terminal device first performing an RRC connection procedure (random access procedure) with the network. The RRC connection procedure involves the UE initially transmitting a random access preamble (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving. This conventional approach may for convenience be referred to herein as a legacy approach.

The random access procedure can be relatively inefficient if the amount of data to be communicated with the network is relatively small, for example in terms of signalling overhead and associated UE power usage. There have therefore been proposals for a UE to communicate higher-layer/user plane data with the network during the RRC connection procedure itself. One approach for this is referred to as Early Data Transmission (EDT) and allows the UE to transmit and/or receive data during the Random Access process whilst in idle mode, thereby communicating the relevant data without the need to complete the establishment of an RRC connection. This can be particularly helpful for infrequent and short messages type of traffic, since EDT would reduce the high overhead for RRC signaling in establishing an RRC connection and performing an RRC disconnection.

Figure 3:
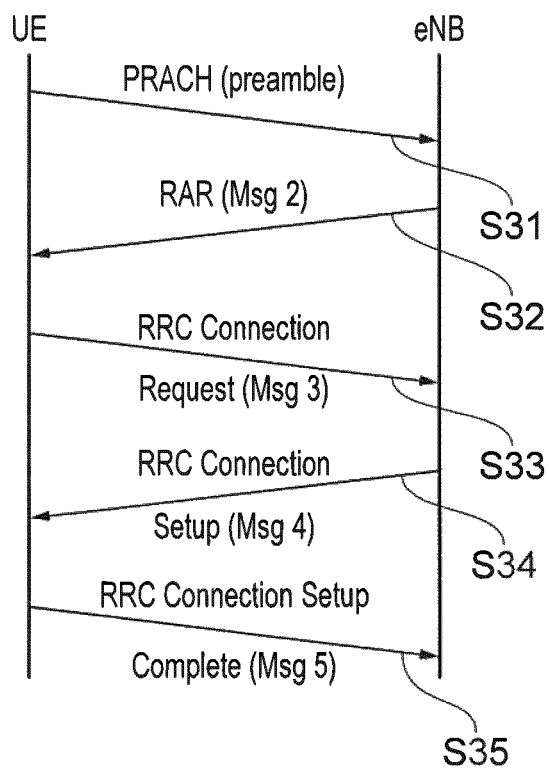
FIG. 3 schematically represents a first example random access procedure for use by different types of terminal device.

FIG. 3 is a ladder diagram that schematically shows message exchange between a UE and an eNodeB in a typical random access procedure to establish an RRC connection, in this example in an LTE-based network. The UE starts the process in step S31 by transmitting a random access request on a physical random access channel (PRACH in an LTE context), i.e. a random access preamble (RACH preamble), to the eNodeB. In step S32, when the eNodeB detects this preamble it will respond with a Random Access Response message (RAR), which is also known as Message 2 (Msg2). The RAR is scheduled by downlink control information (DCI) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step S31, and the RAR will indicate which preamble the eNodeB has detected and is responding to. It may be noted that it is possible that multiple UEs may transmit a random access request using the same PRACH preamble and in the same time and frequency resources. The RAR of step S32 also contains an uplink grant for the preamble the network is responding to so that the UE that transmitted the preamble may use this uplink grant to transmit an RRC Connection Request message, also known as Message 3 (Msg3), to the eNodeB, in step S33. Message 3 also contains an indication of an identifier, ID, for the UE (e.g. a C-RNTI (cell radio network temporary identifier) or S-TMSI (system architecture evolution (SAE) temporary mobile subscriber identity) or a 40-bit random number generated by the UE. The eNodeB will respond to Message 3, in step S34, with Message 4 (Msg4) which carries an RRC Connection Setup message. For the case where multiple UEs use the same preamble, Message 4 provides contention resolution functionality, for example using a terminal device identifier, such as C-RNTI or S-TMSI, transmitted in Message 3 (when a UE receives a Message 4 that contains a portion of the Message 3 containing the UE ID that it transmitted earlier, it knows that there was no contention on the Message 3 that it had transmitted). The RRC connection is complete when the UE transmits Message 5 (Msg5) in step S35 containing an RRC Connection Setup Complete message.

One of the many uses for IoT devices is to provide infrequent reports and receive infrequent commands from the network, where such devices are for example sensors and utility meters, and the IoT device (i.e. UE) is expected to be in power saving mode such as idle mode most of the time to conserve battery power. Hence, when there is data to transmit or receive, the UE needs to reacquire synchronisation, update system information and connect to the network to perform the data exchange, which can take a long time and therefore consume a lot of battery power. Recognising this, in Rel-15, as described above, Early Data Transmission (EDT) is introduced in the uplink, which allows the UE to transmit data to the network during the RRC connection process. In the message exchange shown in FIG. 3, the uplink EDT is transmitted using Message 3 and the UE can move back to idle mode after Message 4. This avoids the need to establish an RRC connection, and hence reduces power consumption.

In Rel-16, Pre-configured Uplink Resource (PUR) is introduced where a set of PUSCH (Physical Uplink Shared Channel) resources are configured for the UE to use without a dynamic UL (uplink) grant signalled by a DCI. The PUR can be used in RRC Connected mode or idle mode. In idle mode, PUR allows the UE to avoid transmitting a PRACH and hence further reduce the overhead for transmitting a short uplink message (the UE requiring a valid timing advance in order to transmit a PUSCH in idle mode, as enabled by [8], for example).

The PUR resources can be either dedicated or shared. When the PUR resources are dedicated, a single UE is assigned those resources. When the PUR resources are shared, more than one UE is assigned those resources. For the case where PUR resources are dedicated, the eNB knows the identity of the UE that is transmitting in the PUR resources (since there is a one-to-one mapping between the dedicated resources and the UE). For the case where PUR resources are shared, there is ambiguity regarding which UE has transmitted using those resources (the identity of the UE is unknown since one set of PUR resources is shared between multiple UEs).

In an arrangement like that illustrated in FIG. 3, the first PUSCH transmission is Msg3 and the RAR in Msg2 provides the UE with an identification such as a (temporary) C-RNTI that is used by the UE for its PUSCH transmission. This C-RNTI allows the eNB to provide HARQ (Hybrid Automatic Repeat Request) feedback for the UE's PUSCH transmission, thereby facilitating HARQ operations such as retransmission and acknowledgements (the C-RNTI allows the eNB to signal which specific UE should transmit and allows the eNB to acknowledge a specific UE). Since PUR transmission can occur prior to Msg2, the eNB cannot recognize which UEs performs the PUSCH transmission, especially when the PUSCH resources configured for PUR can be shared by multiple UEs. There is therefore a need to provide a method for the eNB to address the UE using PUR for HARQ operations.

Deriving UE Identification

Figure 4:
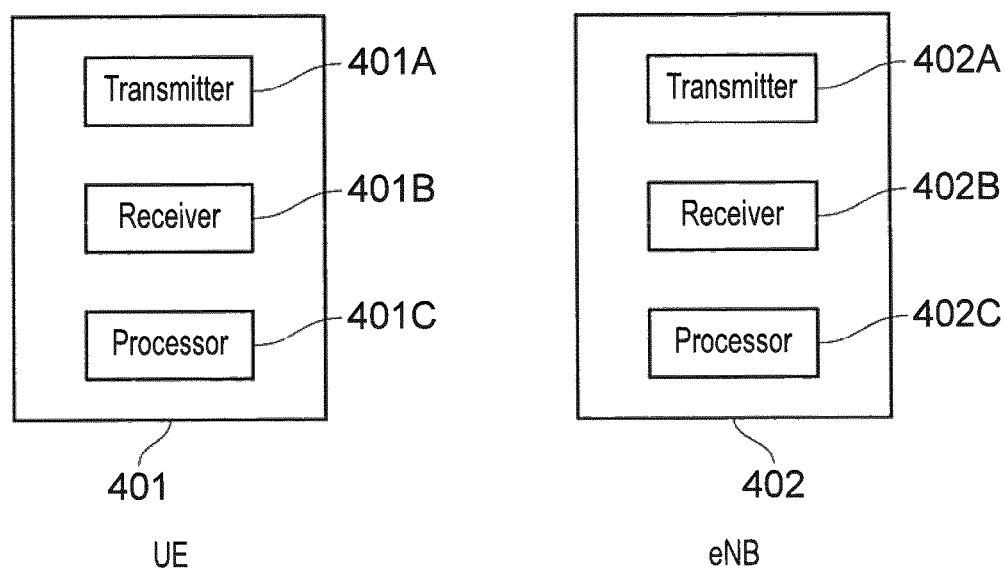
FIG. 4 schematically represents a terminal device and infrastructure equipment according to an embodiment.

FIG. 4 schematically shows a terminal device (UE) 401 and infrastructure equipment 402 (in this example, an eNB) according to an embodiment.

The UE 401 comprises transmitter circuitry 401A for transmitting wireless (e.g. radio) signals, receiver circuitry 401B for receiving wireless (e.g. radio) signals and processor circuitry 401C. The processor circuitry 401C controls the operation of the transmitter circuitry 401A and receiver circuitry 401B and may take the form of, for example, a microprocessor, a CPU, a dedicated chipset or the like.

The eNB 402 comprises transmitter circuitry 402A for transmitting wireless (e.g. radio) signals, receiver circuitry 402B for receiving wireless (e.g. radio) signals and processor circuitry 402C. The processor circuitry 402C controls the operation of the transmitter circuitry 402A and receiver circuitry 402B and may take the form of, for example, a microprocessor, a CPU, a dedicated chipset or the like.

In an embodiment, the transmitter circuitry 401A of the UE 401 is configured to transmit a signal to the eNB 402 using a radio resource of a predetermined set of radio resources configured for use by a plurality of unidentified UEs to transmit signals to the infrastructure equipment. The predetermined set of radio resources is a set of PUR radio resources, for example. The unidentified UEs are unidentified because they are not yet associated with an identifier (such as an RNTI) which allows the eNB 402 to distinguish one UE from another. The UE 401 is one of the unidentified UEs. An identifying feature of the UE 401 (which distinguishes the UE 401 from at least some of the other unidentified UEs) is determinable by the eNB 402 using the transmitted signal. The transmitted signal is received by the receiver circuitry 402B of the eNB 402.

The receiver circuitry 401B is configured to receive, from the eNB 402, at least one of a positive response signal and a negative response signal. The positive and/or negative response signal is transmitted by the transmitter circuitry 402A of the eNB 402.

The positive response signal indicates that the signal transmitted to the eNB 402 was successfully received by the eNB 402 and that the identifying feature of the terminal device was successfully determined by the eNB 402 using the transmitted signal. The UE 401 thus knows that the eNB 402 was able to distinguish the UE 401 from at least some of the other unidentified UEs when it receives the positive response signal. The UE 401 also knows that the eNB 402 is able to associate any information transmitted using the signal (e.g. a meter reading or the like) with the UE 401 (or at least with a subset of the plurality of unidentified UEs). In an embodiment, the identifying feature of the UE 401 distinguishes the UE 401 from all the other unidentified UEs (and therefore the eNB 402 associates any information transmitted using the signal specifically with the UE 401).

The negative response signal indicates that the signal transmitted to the eNB 402 was not successfully received by the eNB 402 or that the identifying feature of the UE 401 was not successfully determined by the eNB 402 using the transmitted signal. The UE 401 thus knows that the eNB 402 was not able to distinguish the UE 401 from at least some of the other unidentified UEs when it receives the negative response signal. The UE 401 also knows that the eNB 402 was not able to associate any information transmitted using the signal (e.g. a meter reading or the like) with the UE 401 (or at least with a subset of the plurality of unidentified UEs). In this case, the UE 401 knows that it must retransmit the signal.

Thus, with the present technique, one of a plurality of unidentified UEs can be distinguished (identified) from at least some of the other unidentified UEs without the eNB first explicitly assigning identifier (e.g. an RNTI) to the UE (e.g. using Msg2). In an embodiment, a different identifying feature of the UE can be used for different aspects of the HARQ operation. Examples of the identifying feature of the UE 401 are given below.

In an embodiment, the positive response signal is a HARQ acknowledgement (HARQ-ACK) for a PUR is transmitted using a DCI. This DCI can be the explicit HARQ-ACK DCI used for Rel-15 connected mode PUSCH, for example, which is represented by the following bit sequences (as defined in [9]):

For CE (coverage enhancement) Mode A: DCI format 6-0A with the Resource Block Assignment field set to all 1s and, except for the DCI repetition field, all remaining fields are set to 0s.

For CE (coverage enhancement) Mode B: DCI format 6-0B with MCS field set to all 1s and, except for the DCI repetition field, all remaining fields are set to 0s.

In an embodiment, the DCI carrying the HARQ-ACK uses what will be referred to as an ACK-RNTI. That is, the cyclic redundancy check (CRC) of this DCI is masked with an ACK-RNTI. The ACK-RNTI is generated using the identifying feature of the signal transmitted from the UE 401 to the eNB 402 discussed above. The following paragraphs provide example embodiment that describe how the ACK-RNTI is derived.

In an embodiment, the ACK-RNTI is a truncated part of the CRC that is used in the PUR PUSCH. This recognises that the CRC used for the PUSCH is 24 bits whilst that used for DCI is 16 bits. The truncation can be, for example, the first 16 bits of the PUSCH CRC. Other truncations can be used, for example, the last 16 bits of the PUSCH CRC. This truncated CRC is used as the ACK-RNTI that is masked with the DCI's CRC.

Figure 5:
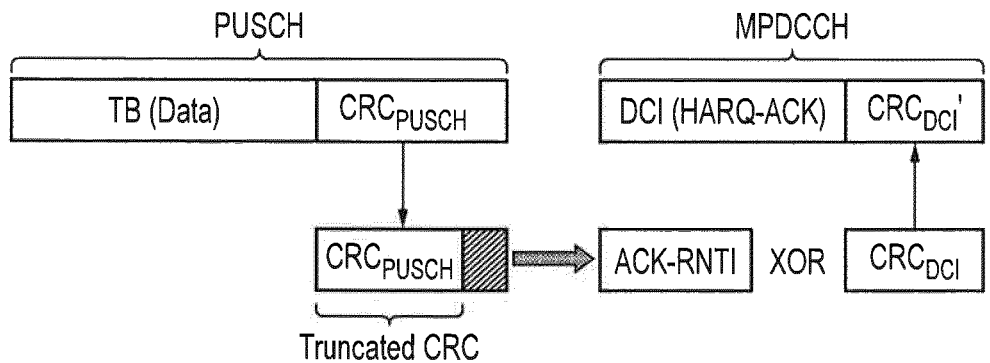
FIG. 5 schematically represents an arrangement for determining an identifying feature of the terminal device.

A logical representation of this process is schematically exemplified in FIG. 5. Here the eNB receives the PUSCH from a PUR transmission successfully and extracts the $CRC_{PUSCH}$ which is 24 bits long (note by successfully decoding the PUSCH the eNB would have obtained this CRC). It then truncates this CRC by taking only the first 16 bits. It constructs a DCI (e.g. format 6-0A) to carry an explicit HARQ-ACK and derives a 16 bit $CRC_{DCI}$ for this DCI. It then uses the truncated $CRC_{PUSCH}$ as an ACK-RNTI, which masks the $CRC_{DCI}$ through an XOR operation, to produce a field $CRC_{DCI'}$. $CRC_{DCI'}$ is then used as the CRC field in the MPDCCH.

In an embodiment, the ACK-RNTI is formed from a hash function (where a hash function is any function that can be used to map data of arbitrary size to data of a fixed size) of the transport block received within the PUSCH for PUR. That is, the transport block is input to a hash function that outputs a 16-bit value, the specific 16-bit value being a function of the content of the transport block. The 16-bit hash function is used as the ACK-RNTI to mask the $CRC_{DCI}$, as per the previous embodiment.

In an embodiment, the ACK-RNTI is indicated by the UE when transmitting the PUSCH. This ACK-RNTI can be, for example, a field in the MAC layer of the PUSCH. The ACK-RNTI may be a number (e.g. a random number) generated by the UE, for example.

Figure 6:
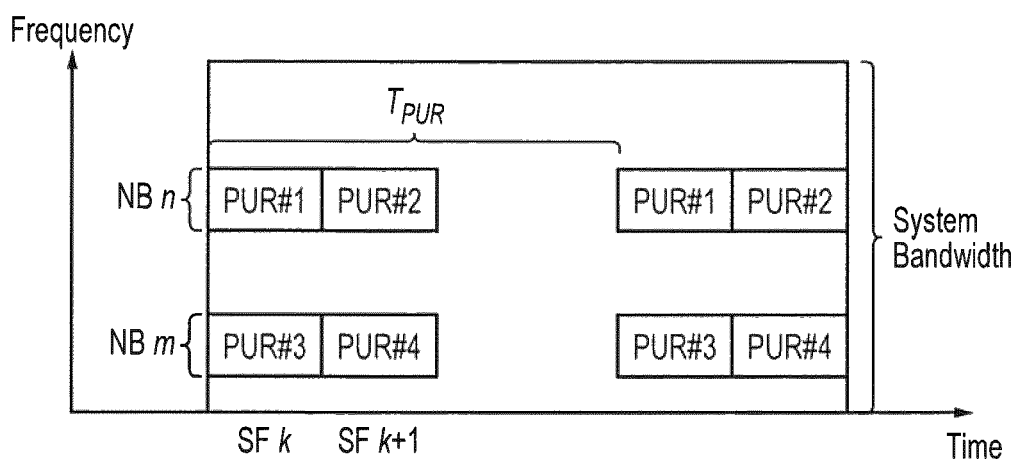
FIG. 6 schematically represents another arrangement for determining an identifying feature of the terminal device.

In an embodiment, the ACK-RNTI is a function of the frequency and time resources used in the PUR. The PUR may consist of multiple PUSCH occupying a set of frequency and time resources and the UE selects one of these PUSCH for PUR transmission. For example, in FIG. 6, the PUR is configured to occur periodically with period $T_{PUR}$ wherein, in each period, there are 4 PUR PUSCH resources labelled as PUR #1, PUR #2, PUR #3 & PUR #4. PUR #1 & PUR #2 use narrowband NB n whilst PUR #3 & PUR #4 use narrowband NB m. PUR #1 & PUR #3 occupy subframe k and PUR #2 & PUR #4 occupy the next subframe, i.e. subframe k+1. Hence the ACK-RNTI can be a function of the frequency resources (e.g. narrowband) and time resource (e.g. subframe) used in each PUR period. This embodiment allows the eNB to focus on the specific UE using a specific PUR resource. In this case, if multiple UEs simultaneously use the same specific PUR resource, the eNB is not able to identify a single UE from the plurality of unidentified UEs. Rather, the specific PUR resource is an identifying feature of the subset of all UEs in the plurality of unidentified UEs which simultaneously used the same PUR resource.

In an embodiment, the HARQ-ACK is transmitted in a PDSCH. This PDSCH can either be signalled dynamically via DCI or be transmitted in known resources with a known format. This PDSCH carries the CRC that is used by the UE in the PUSCH for PUR transmission. When the eNB successfully decodes the PUSCH, it is able to extract the CRC used for the PUSCH ($CRC_{PUSCH}$) and use this CRC in the acknowledgement for the UE's PUR transmission. The PDSCH can be processed according to one of several methods. For example:

The $CRC_{PUSCH}$ is the transport block that is input to the PDSCH transport channel processing. A separate PDSCH-CRC would then be added during the PDSCH transport channel processing.

The PDSCH transport channel processing does not append its own PDSCH-CRC and just replays the $CRC_{PUSCH}$.

The PDSCH carrying the $CRC_{PUSCH}$ can carry multiple $CRC_{PUSCH}$ for different UEs. This allows the PDSCH to simultaneously acknowledge more than one UE. For example, the PDSCH can acknowledge all of the PUSCH for PUR that were transmitted in a certain time period (e.g. in a certain subframe). A UE that had transmitted on PUR resources would then decode this PDSCH and if it decodes the $CRC_{PUSCH}$ that it transmitted, it would understand that its PUSCH on PUR had been positively acknowledged.

While the above example describes acknowledgement via PDSCH using the $CRC_{PUSCH}$ as the acknowledgement, the PDSCH could alternatively transmit a hash function (known to the UE) of the message received by the eNB on the PUSCH for PUR resources. Alternatively, the PDSCH could replay a portion of the message received by the eNB on the PUSCH for PUR resources. In general, any other information unique to the UE which transmitted the PUSCH message could be included in the acknowledgement (this acting as the ACK-RNTI).

In another embodiment, the UE monitors for a HARQ-ACK feedback for a pre-determined time period $T_{ACK}$. The UE can, for example, monitor the MPDCCH Common Search Space for a DCI with its CRC masked with the ACK-RNTI during this time period $T_{ACK}$. If it fails to detect the HARQ-ACK, then the UE assumes that the PUSCH using PUR has failed and the UE will retransmit the original signal.

Two examples of when the eNB fails to receive a PUR transmission are:

The eNB fails to detect any PUSCH in the PUR.

The eNB detects transmission in the PUR but fails to decode the PUSCH. This can be due to poor SNR or a collision between multiple UEs using the same PUR resource, for example.

When the failure is due to decoding errors, the eNB can transmit a HARQ negative acknowledgement (HARQ-NACK) as a negative response signal to the UE. In response to this, the UE attempts to retransmit the original signal.

In an embodiment, the HARQ-NACK is transmitted using a DCI. The UE monitors the MPDCCH Common Search Space for this DCI.

In an example, a time window $T_{NACK}$ can be configured in which the UE monitors for the HARQ-NACK. If the UE does not receive a HARQ-ACK and, furthermore, does not receive a HARQ-NACK within the time window $T_{NACK}$, then the UE assumes that the eNB failed to detect any PUSCH energy. The UE therefore retransmits the original signal.

In another example, the DCI carrying the HARQ-NACK uses a NACK-RNTI. For example, the CRC of this DCI is masked with the NACK-RNTI. The NACK-RNTI is known to each of the unidentified UEs (e.g. those using PUR) in advance (e.g. it can be configured in the System Information Blocks (SIBs) or specified in the specifications), since the eNB is not aware which UE failed the PUSCH transmission. Any UE which transmitted a signal and receives the NACK-RNTI therefore retransmits the original signal.

In another example, the NACK-RNTI is a function of the frequency and time resources used for the PUR transmission. This is similar to the ACK-RNTI configuration described with reference to FIG. 6. In this example, the ACK-RNTI can be the same as the NACK-RNTI and the DCI has a particular characteristic which indicates whether it is an ACK or a NACK, e.g. the DCI can indicate an explicit HARQ-ACK to represent ACK or can schedule a retransmission to represent NACK. Alternatively, when it is an ACK, the DCI can include a further mechanism to allow the UE to determine the ACK-RNTI (e.g. one of the other ACK-RNTI embodiments described above). That is, a UE monitors for a response signal for the PUR resource used by the UE to transmit the original signal (e.g. based on frequency and time of the PUR resource). If a response signal for the PUR resource is received, then the UE determines whether the ACK-RNTI is present. If yes, then the UE determines the response to be positive (i.e. an ACK-RNTI). If no, then the UE determines the response to be negative (i.e. a NACK-RNTI). This allows the UE to monitor for a single MPDCCH for both an ACK and a NACK, thereby reducing the amount of processing required and saving battery life.

In an embodiment, when the UE receives a HARQ-NACK, it will retransmit the signal using UL EDT via Msg3 (as described with reference to FIG. 3).

In an embodiment, when the UE receives a HARQ-NACK, it will retransmit the signal by establishing an RRC Connection with the eNB.

In an embodiment, the DCI indicating the NACK is an uplink grant message. This uplink grant message schedules a PUSCH retransmission for the UE using the identified PUR resource (i.e. the uplink grant states that the UE that used a certain set of PUR resources, referred to as the identified PUR resource, should re-transmit using the newly scheduled PUSCH resources). The eNB may schedule multiple PUSCH resources and the UE then randomly selects one of these PUSCH resources for retransmission. If the PUR transmission failed due to a collision, this alleviates the risk of a further collision occurring (since the UEs which collided are unlikely to randomly select the same newly scheduled PUSCH resource). In an example, the multiple scheduled PUSCH resources occupy multiple different time resources and/or multiple different frequency resources. Each UE which needs to retransmit therefore randomly selects a time and frequency in which to re-transmit the PUSCH.

In an embodiment, the DCI indicating the NACK is a downlink grant message. This downlink grant message schedules a Msg2 (which could, for example, have a similar format to the RAR). In one example, the scheduled Msg2 provides an UL grant for UL EDT via Msg3 (similarly to the way that a RAR provides an UL grant during a PRACH process). In another example, the scheduled Msg2 provides multiple PUSCH resources that are provided for the UE and the UE randomly selects one of these PUSCH resources for retransmission. In another example, the Msg2 indicates to the UE to wait for a random delay period and then attempt to use UL EDT via Msg3. Again, the random selection of PUSCH resources or a delay period alleviates the risk of a further collision in the case that the failure of the original signal was due to a collision between multiple UEs (the multiple UEs are unlikely to randomly choose the same PUSCH resource or random time period). In another example, the Msg2 indicates to the UE to establish an RRC Connection in order to retransmit the signal.

The following embodiments describe the case where the eNB fails to detect any signal from the UE. The UE knows this if, for example, it does not receive a HARQ-ACK within the time period $T_{ACK}$ and/or it does not receive a HARQ-NACK within the time period $T_{NACK}$. It will be appreciated that the following embodiments can be used even if the HARQ-ACK and/or HARQ-NACK is not configured.

In an embodiment, if the UE realizes that the eNB fails to detect any PUSCH by the absence of HARQ-ACK and/or HARQ-NACK feedback, the UE initiates an RRC connection in order to retransmit the signal to the eNB.

In an embodiment, if the UE realizes that the eNB fails to detect any PUSCH by the absence of HARQ-ACK and/or HARQ-NACK feedback, the UE retransmits the signal to the eNB using UL EDT via Msg3.

In an embodiment, the eNB broadcasts, as a negative response signal, a signal indicating that no signal has been detected. This signal may be referred to as a "DTX indicator". The DTX (Did not Transmit) indicator can be, for example:
- A general DTX indicator that is applicable to all PUR (so received by all PUR UEs)
- Specific to a group of PUR (so received only by PUR UEs which transmitted a signal to the eNB using one of an indicated group of PUR resources)
- Specific to a single PUR (so received only by PUR UEs which transmitted a signal to the eNB using a specific indicated PUR resource)

Figure 7:
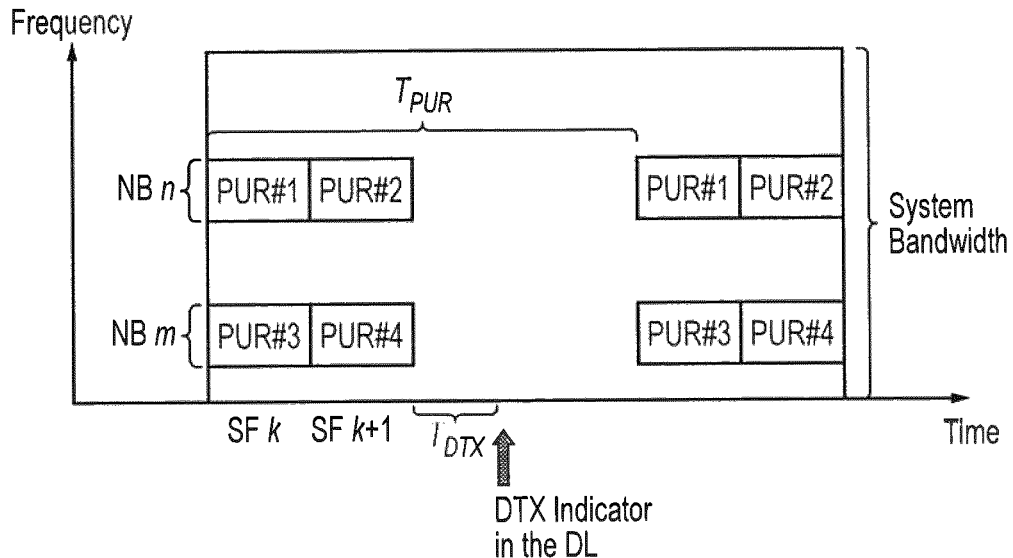
FIG. 7 schematically represents an arrangement for transmission of a negative response signal from the infrastructure equipment to the terminal device.

FIG. 7 shows an example in which a set of PUR is configured that occur with periodicity $T_{PUR}$ and in each period there are 4 PUSCH resources occupying narrowband NB n and NB m and two subframes. A DTX indicator is transmitted after a time $T_{DTX}$ after occurrence of the final PUSCH resource(s) in the downlink to indicate that no energy is detected in all or some of the PUSCH resources. The UEs concerned therefore perform retransmission in response to receiving the DTX indicator.

In an embodiment, the DTX indicator is transmitted using a DCI. The UE monitors the MPDCCH Common Search Space for this said DCI. This can be a Group Common DCI which has a bitmap where each bit in the bitmap indicates whether or not the eNB detected any energy in a respective one of the PUR PUSCH resources. For example, if there are four PUR PUSCH resources and a four bit bitmap, then the first resource is associated with the first bit, the second resource is associated with the second bit, the third resource is associated with the third bit and the fourth resource is associated with the fourth bit. If a 1 indicates that energy was detected and a 0 indicates that energy was not detected, then a bit map of 1111 indicates that energy was detected in each of the resources. A bit map of 0000 indicates that no energy was detected in any of the resources. A bit map of 0101 indicates that energy was detected in two of the four resources (in particular, the second and fourth resources). Each UE thus knows whether or not a retransmission is necessary, depending on which PUR PUSCH resource the UE used to make the original transmission.

Figure 8:
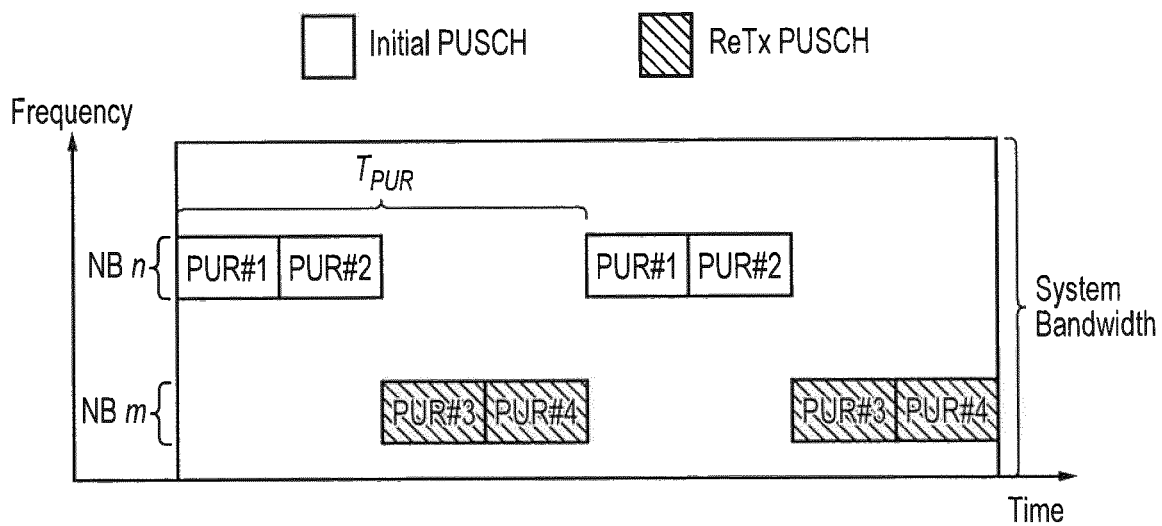
FIG. 8 schematically represents a retransmission arrangement.

In an embodiment, when the UE is aware that the eNB fails to receive a PUSCH (e.g. because it receives a relevant DTX indicator), the UE retransmits the PUSCH in a different PUR resource. That is, the PUR consists of a set of resources for initial PUSCH transmission and another set for retransmission. An example of this is shown in FIG. 8, in which there is a set of resources PUR #1 and PUR #2 for initial PUSCH transmission and another set of resources PUR #3 and PUR #4 for PUSCH retransmission. A link can be defined such that initial transmission using PUR #1 retransmits using PUR #3 and initial transmission using PUR #2 retransmits using PUR #4. In an example, if the eNB fails to decode or detect a PUSCH in PUR #1, it attempts to blindly combine the PUR #3 with PUR #1 to see if it can detect a PUSCH. It will be appreciated that, although, in this example, the retransmission PUR occupy a different narrowband to the initial transmission PUR (so as to provide frequency diversity), the retransmission PUR may alternatively occupy the same narrowband but different time resources. It is also possible that there is a further set of PUR resources used for a $2^{nd}$ (or further) retransmission (e.g. PUR #5 AND PUR #6, not shown) for use in the case that the initial retransmission fails.

It will be appreciated that the DTX indicator may be implemented without the HARQ-ACK or HARQ-NACK. In this case, the UE determines that the signal was successfully received (and the identifying feature of the UE was successfully determined) in the absence of a DTX and that the signal was not successfully received (or that the identifying feature of the UE was not successfully determined) in the presence of a DTX. It will also be appreciated that it is possible to implement just the ACK-RNTI without the NACK-RNTI (since the absence of a HARQ-ACK means that the eNB did not successfully receive the signal and determine the identifying feature of the UE). It will be appreciated that, in general, the ACK-RNTI, NACK-RNTI and/or DTX may be configured, as appropriate, depending on the needs of the system.

Figure 9:
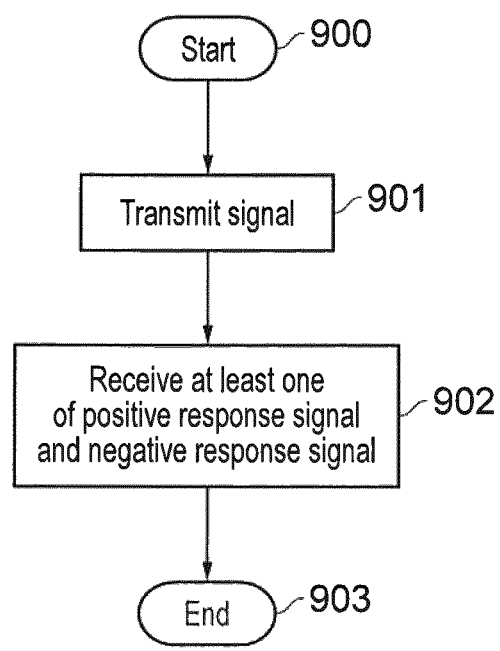
FIG. 9 shows a method of operating a terminal device according to an embodiment.

FIG. 9 shows a method of operating the terminal device 401 according to an embodiment. The method starts at step 900. At step 901, the processor circuitry 401C controls the transmitter circuitry 401A to transmit a signal to the infrastructure equipment 402 using a radio resource of a predetermined set of radio resources configured for use by a plurality of unidentified terminal devices to transmit signals to the infrastructure equipment 402, an identifying feature of the terminal device 401 being determinable using the signal transmitted to the infrastructure equipment 402. At step 902, the processor circuitry 401C controls the receiver circuitry 401B to receive, from the infrastructure equipment 402, at least one of a positive response signal and a negative response signal. The positive response signal indicates that the signal transmitted to the infrastructure equipment 402 was successfully received by the infrastructure equipment 402 and that the identifying feature of the terminal device 401 was successfully determined by the infrastructure equipment 402 using the signal transmitted to the infrastructure equipment 402. The negative response signal indicates that the signal transmitted to the infrastructure equipment 402 was not successfully received by the infrastructure equipment 402 or that the identifying feature of the terminal device 401 was not successfully determined by the infrastructure equipment 402 using the signal transmitted to the infrastructure equipment 402. The process ends at step 903.

Figure 10:
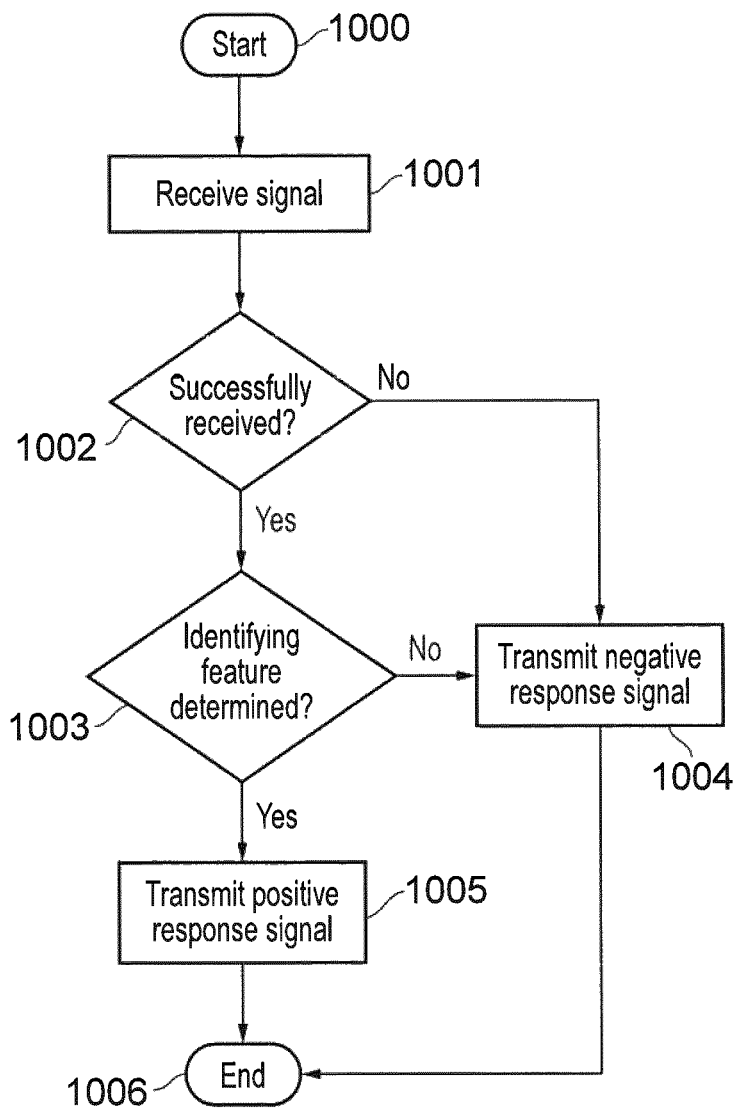
FIG. 10 shows a method of operating a terminal device according to an embodiment.

FIG. 10 shows a method of operating the infrastructure equipment 402 according to an embodiment. The method starts at step 1000. At step 1001, the processor circuitry 402C controls the receiver circuitry 402C to receive a signal from the terminal device 401 transmitted using a radio resource of a predetermined set of radio resources configured for use by a plurality of unidentified terminal devices to transmit signals to the infrastructure equipment 402, an identifying feature of the terminal device 401 being determinable using the received signal.

At step 1002, it is determined whether or not the signal transmitted by the terminal device 401 was successfully received by the receiver circuitry 402B. If the signal transmitted by the terminal device 401 was successfully received by the receiver circuitry 402B, then the processor circuitry 402C performs an identification process to determine the identifying feature of the terminal device 401 using the received signal and determines whether or not the identifying feature of the terminal device 401 was successfully identified by the identification process (step 1003).

If the identifying feature of the terminal device 401 was successfully identified, then the processor circuitry 402C controls the transmitter circuitry 402A to transmit a positive response signal to the terminal device 401 (step 1005). The positive response signal indicates that the signal transmitted by the terminal device 401 was successfully received by the infrastructure equipment 402 and that the identifying feature of the terminal device was successfully determined by the identification process.

On the other hand, if it is determined at step 1002 that the signal transmitted by the terminal device 401 was not successfully received by the receiver circuitry 402B or if it is determined at step 1003 that the identifying feature of the terminal device 401 was not successfully identified, then the processor circuitry 402C controls the transmitter circuitry 402A to transmit a negative response signal to the terminal device 401 (step 1004). The negative response signal indicates that the signal transmitted by the terminal device 401 was not successfully received by the infrastructure equipment or that the identifying feature of the terminal device was not successfully determined by the identification process.

The process ends at step 1006.

Those skilled in the art would appreciate that the methods shown by FIGS. 9 and 10 may be adapted in accordance with embodiments of the present technique. For example, other intermediate steps may be included in the method, or the steps may be performed in any logical order.

Those skilled in the art would further appreciate that such infrastructure equipment and/or terminal devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered clauses define some embodiments of the present technique:

1. A terminal device for use in a wireless telecommunications network, the terminal device comprising:
   transmitter circuitry configured to transmit a signal to infrastructure equipment of the wireless telecommunications network using a radio resource of a predetermined set of radio resources configured for use by a plurality of unidentified terminal devices to transmit signals to the infrastructure equipment, an identifying feature of the terminal device being determinable using the signal transmitted to the infrastructure equipment;
   receiver circuitry configured to receive, from the infrastructure equipment, at least one of:
   a positive response signal indicating that the signal transmitted to the infrastructure equipment was successfully received by the infrastructure equipment and that the identifying feature of the terminal device was successfully determined by the infrastructure equipment using the signal transmitted to the infrastructure equipment; and
   a negative response signal indicating that the signal transmitted to the infrastructure equipment was not successfully received by the infrastructure equipment or that the identifying feature of the terminal device was not successfully determined by the infrastructure equipment using the signal transmitted to the infrastructure equipment.

2. A terminal device according to clause 1, wherein the signal transmitted to the infrastructure equipment is transmitted using a Physical Uplink Shared Channel, PUSCH, radio resource.

3. A terminal device according to clause 2, wherein the signal transmitted to the infrastructure equipment is transmitted using a Pre-configured Uplink Resource, PUR, radio resource.

4. A terminal device according to any preceding clause, wherein the identifying feature of the terminal device comprises a combination of a time and a frequency in a radio frame of the radio resource used to transmit the signal to the infrastructure equipment.

5. A terminal device according to any preceding clause, wherein the signal transmitted to the infrastructure equipment comprises a message from which the identifying feature of the terminal device is determinable.

6. A terminal device according to clause 5, wherein the message of the signal transmitted to the infrastructure equipment comprises a cyclic redundancy check, CRC, code and the identifying feature of the terminal device comprises a portion of the CRC code.

7. A terminal device according to clause 5, wherein the identifying feature of the terminal device comprises an output of a predetermined hash function applied to the message of the signal transmitted to the infrastructure equipment.

8. A terminal device according to clause 5, wherein the identifying feature of the terminal device comprises a number generated by the terminal device in the message of the signal transmitted to the infrastructure equipment.

9. A terminal device according to any preceding clause, wherein:
   the positive response signal has a characteristic indicative of the identifying feature of the terminal device; and
   the terminal device comprises processor circuitry configured to interpret a signal received by the receiver circuitry as a positive response signal when the received signal has the characteristic indicative of the identifying feature of the terminal device.

10. A terminal device according to clause 9, wherein:
   the positive response signal comprises a message comprising, as the characteristic indicative of the identifying feature of the terminal device, a cyclic redundancy check, CRC, code masked with information indicative of the identifying feature of the terminal device; and
   upon the receiver circuitry receiving a signal, the processor circuitry is configured to:
   perform a process to retrieve an unmasked CRC code of a message comprised within the received signal using the information indicative of the identifying feature of the terminal device;
   perform a cyclic redundancy check on the unmasked CRC code;
   determine the received signal to be the positive response signal if the cyclic redundancy check is successful.

11. A terminal device according to clause 9, wherein:
   the positive response signal comprises a message comprising, as the characteristic associated with the identifying feature of the terminal device, information indicative of the identifying feature of the terminal device; and
   upon the receiver circuitry receiving a signal, the processor circuitry is configured to:
   determine the received signal to be the positive response signal if a message comprise within the received signal comprises the information indicative of the identifying feature of the terminal device.

12. A terminal device according to any preceding clause, wherein the positive response signal is a hybrid automatic repeat request acknowledgement signal, HARQ-ACK.

13. A terminal device according to any preceding clause, wherein the positive response signal is comprised within downlink control information, DCI.

14. A terminal device according to any one of clauses 1 to 12, wherein the positive response signal is transmitted using a Physical Downlink Shared Channel, PDSCH, radio resource.

15. A terminal device according to any preceding clause, wherein:
the receiver circuitry is configured to receive the positive response signal from the infrastructure equipment; and
the terminal device comprises processor circuitry configured control the transmitter circuitry to retransmit the signal to the infrastructure equipment if the positive response signal is not received within a predetermined positive response signal time period.

16. A terminal device according to clause 15, wherein the transmitter circuitry is configured to retransmit the signal to the infrastructure equipment via Uplink Early Data Transmission, UL EDT.

17. A terminal device according to clause 15, wherein the terminal device comprises processor circuitry configured to control the transmitter circuitry to retransmit the signal to the infrastructure equipment by establishing a Radio Resource Control (RRC) connection with the infrastructure equipment.

18. A terminal device according to any preceding clause, wherein:
the negative response signal indicates that the signal transmitted to the infrastructure equipment was successfully received by the infrastructure equipment but that the identifying feature of the terminal device was not successfully determined by the infrastructure equipment using the signal transmitted to the infrastructure equipment; and
the terminal device comprises processor circuitry configured, in response to the negative response signal, to control the transmitter circuitry to retransmit the signal to the infrastructure equipment.

19. A terminal device according to clause 18, wherein:
the negative response signal has a predetermined characteristic indicative that the identifying feature of the terminal device was not successfully determined; and
the terminal device comprises processor circuitry configured to interpret a signal received by the receiver circuitry as a negative response signal when the received signal has the predetermined characteristic.

20. A terminal device according to clause 19, wherein:
the negative response signal comprises a message comprising, as the predetermined characteristic, a cyclic redundancy check, CRC, code masked with predetermined information; and
upon the receiver circuitry receiving a signal, the processor circuitry is configured to:
perform a process to retrieve an unmasked CRC code of a message comprised within the received signal using the predetermined information;
perform a cyclic redundancy check on the unmasked CRC code;
determine the received signal to be the negative response signal if the cyclic redundancy check is successful.

21. A terminal device according to clause 19, wherein:
the negative response signal comprises a message comprising, as the negative response signal characteristic, predetermined information; and
upon the receiver circuitry receiving a signal, the processor circuitry is configured to:
determine the received signal to be the negative response signal if a message comprise within the received signal comprises the predetermined information.

22. A terminal device according to any one of clauses 18 to 21, wherein:
the negative response signal is indicative of a combination of a time and a frequency in a radio frame of the radio resource used to transmit the signal to the infrastructure equipment; and
(i) the negative response signal has a predetermined characteristic indicative that the identifying feature of the terminal device was not successfully determined or (ii) the signal transmitted to the infrastructure equipment comprises a message from which the identifying feature of the terminal device is determinable.

23. A terminal device according to any preceding clause, wherein the negative response signal is a hybrid automatic repeat request negative acknowledgement signal, HARQ-NACK.

24. A terminal device according to any preceding clause, wherein the negative response signal is comprised within downlink control information, DCI.

25. A terminal device according to clause 24, wherein:
the negative response signal indicates a Physical Uplink Shared Channel (PUSCH) radio resource; and
the transmitter circuitry is configured to retransmit the signal to the infrastructure equipment using the PUSCH radio resource indicated by the negative response signal.

26. A terminal device according to clause 25, wherein:
the negative response signal indicates a radio resource used to transmit the signal in response to which the negative response signal is transmitted; and
the terminal device comprises processor circuitry configured to control the transmitter circuitry to retransmit the signal to the infrastructure equipment using the PUSCH radio resource indicated by the negative response signal if the radio resource used to transmit the signal in response to which the negative response signal was transmitted is the radio resource used by the transmitter circuitry to transmit the signal to the infrastructure equipment.

27. A terminal device according to clause 25 or 26, wherein:
the negative response signal indicates a plurality of PUSCH radio resources; and
the terminal device comprises processor circuitry configured to randomly select one or more of the indicated plurality of PUSCH radio resources and to control the transmitter circuitry to retransmit the signal to the infrastructure equipment using the randomly selected one or more of the indicated plurality of PUSCH radio resources.

28. A terminal device according to clause 24, wherein:
the negative response signal indicates a radio resource to be used by the infrastructure equipment to transmit a further response signal to the terminal device, the further response signal indicating to the terminal device to retransmit the signal to the infrastructure equipment;
the receiver circuitry is configured to receive the further response signal using the radio resource indicated by the negative response signal; and
the transmitter circuitry is configured to retransmit the signal to the infrastructure equipment.

29. A terminal device according to clause 28, wherein:
the further response signal indicates to the terminal device to retransmit the signal to the infrastructure equipment via Uplink Early Data Transmission, UL EDT; and
the transmitter circuitry is configured to retransmit the signal to the infrastructure equipment via UL EDT.

30. A terminal device according to clause 29, wherein:
the further response signal indicates an UL EDT radio resource; and
the transmitter circuitry is configured to retransmit the signal to the infrastructure equipment using the indicated UL EDT radio resource.

31. A terminal device according to clause 29 or 30, wherein:
the further response signal indicates to the terminal device to retransmit the signal to the infrastructure equipment after a random delay time period has elapsed; and
the transmitter circuitry is configured to retransmit the signal to the infrastructure equipment after the random delay time period has elapsed.

32. A terminal device according to clause 28, wherein:
the further response signal indicates a plurality of PUSCH radio resources; and
the terminal device comprises processor circuitry configured to randomly select one or more of the indicated plurality of PUSCH radio resources and to control the transmitter circuitry to retransmit the signal to the infrastructure equipment using the randomly selected one or more of the indicated plurality of PUSCH radio resources.

33. A terminal device according to clause 28, wherein:
the further response signal indicates to the terminal device to retransmit the signal to the infrastructure equipment by establishing a Radio Resource Control (RRC) connection with the infrastructure equipment; and
the terminal device comprises processor circuitry configured to control the transmitter circuitry to retransmit the signal to the infrastructure equipment by establishing a Radio Resource Control (RRC) connection with the infrastructure equipment.

34. A terminal device according to any one of clauses 18 to 33, wherein:
the receiver circuitry is configured to receive the negative response signal from the infrastructure equipment; and
the terminal device comprises processor circuitry configured control the transmitter circuitry to retransmit the signal to the infrastructure equipment if the negative response signal is not received within a predetermined negative response signal time period.

35. A terminal device according to clause 34, wherein the transmitter circuitry is configured to retransmit the signal to the infrastructure equipment via Uplink Early Data Transmission, UL EDT.

36. A terminal device according to clause 34, wherein the terminal device comprises processor circuitry configured to control the transmitter circuitry to retransmit the signal to the infrastructure equipment by establishing a Radio Resource Control (RRC) connection with the infrastructure equipment.

37. A terminal device according to any one of clauses 1 to 14, wherein:
the negative response signal indicates that the signal transmitted to the infrastructure equipment was not successfully received by the infrastructure equipment.
the terminal device comprises processor circuitry configured, in response to the negative response signal, to control the transmitter circuitry to retransmit the signal to the infrastructure equipment.

38. A terminal device according to clause 37, wherein:
the negative response signal indicates one or more radio resources of the predetermined set of radio resources configured for use by the plurality of unidentified terminal devices to transmit signals to the infrastructure equipment for which a signal was not successfully received by the infrastructure equipment; and
the processor circuitry controls the transmitter circuitry to retransmit the signal to the infrastructure equipment if the radio resource used to transmit the signal to the infrastructure equipment is indicated by the negative response signal.

39. A terminal device according to clause 38, wherein the negative response signal is comprised within downlink control information, DCI.

40. A terminal device according to clause 39, wherein the one or more radio resources of the predetermined set of radio resources configured for use by the plurality of unidentified terminal devices to transmit signals to the infrastructure equipment for which a signal was not successfully received by the infrastructure equipment is indicated by a bitmap comprised within the DCI, each bit of the bitmap corresponding to a respective radio resource of the predetermined set of radio resources.

41. A terminal device according to any one of clauses 37 to 40, wherein the transmitter circuitry is configured to retransmit the signal to the infrastructure equipment using a radio resource of the predetermined set of radio resources configured for use by the plurality of unidentified terminal devices to transmit signals to the infrastructure equipment linked to the radio resource used to transmit the signal to the infrastructure equipment.

42. Infrastructure equipment for use in a wireless telecommunications network, the infrastructure equipment comprising:
receiver circuitry configured to receive a signal from a terminal device of the wireless telecommunications network transmitted using a radio resource of a predetermined set of radio resources configured for use by a plurality of unidentified terminal devices to transmit signals to the infrastructure equipment, an identifying feature of the terminal device being determinable using the received signal;
processor circuitry configured:
to determine whether or not the signal transmitted by the terminal device was successfully received by the receiver circuitry, and
if the signal transmitted by the terminal device was successfully received by the receiver circuitry, to perform an identification process to determine the identifying feature of the terminal device using the received signal and to determine whether or not the identifying feature of the terminal device was successfully identified by the identification process; and
transmitter circuitry configured to transmit, to the terminal device, at least one of:
a positive response signal indicating that the signal transmitted by the terminal device was successfully received by the infrastructure equipment and that the identifying feature of the terminal device was successfully determined by the identification process, the positive response signal being transmitted when the processor circuitry determines that the signal transmitted by the terminal device was successfully received by the receiver circuitry and that the identifying feature of the terminal device was successfully determined by the identification process; and a negative response signal indicating that the signal transmitted by the terminal device was not successfully received by the infrastructure equipment or that the identifying feature of the terminal device was not successfully determined by the identification process, the negative response signal being transmitted when the processor circuitry determines that the signal transmitted by the terminal device was not successfully received by the receiver circuitry or that the identifying feature of the terminal device was not successfully determined by the identification process.

43. Infrastructure equipment according to clause 42, wherein the signal transmitted by the terminal device is transmitted using a Physical Uplink Shared Channel, PUSCH, radio resource.

44. Infrastructure equipment according to clause 43, wherein the signal transmitted by the terminal device is transmitted using a Pre-configured Uplink Resource, PUR, radio resource.

45. Infrastructure equipment according to any one of clauses 42 to 44, wherein the identifying feature of the terminal device comprises a combination of a time and a frequency in a radio frame of the radio resource used by the terminal device to transmit the signal.

46. Infrastructure equipment according to any one of clauses 42 to 45, wherein the signal transmitted by the terminal device comprises a message from which the identifying feature of the terminal device is determinable.

47. Infrastructure equipment according to clause 46, wherein the message of the signal transmitted by the terminal device comprises a cyclic redundancy check, CRC, code and the identifying feature of the terminal device comprises a portion of the CRC code.

48. Infrastructure equipment according to clause 46, wherein the identifying feature of the terminal device comprises an output of a predetermined hash function applied to the message of the signal transmitted by the terminal device and the processor circuitry is configured to apply the predetermined hash function to the message of the signal transmitted by the terminal device to determine the identifying feature of the terminal device.

49. Infrastructure equipment according to clause 46, wherein the identifying feature of the terminal device comprises a number generated by the terminal device in the message of the signal transmitted to the infrastructure equipment.

50. Infrastructure equipment according to any one of clauses 42 to 49, wherein:
the positive response signal has a characteristic indicative of the identifying feature of the terminal device.

51. Infrastructure equipment according to clause 50, wherein:
the positive response signal comprises a message comprising, as the characteristic indicative of the identifying feature of the terminal device, a cyclic redundancy check, CRC, code masked with information indicative of the identifying feature of the terminal device.

52. Infrastructure equipment according to clause 50, wherein:
the positive response signal comprises a message comprising, as the characteristic associated with the identifying feature of the terminal device, information indicative of the identifying feature of the terminal device.

53. Infrastructure equipment according to any one of clauses 42 to 52, wherein the positive response signal is a hybrid automatic repeat request acknowledgement signal, HARQ-ACK.

54. Infrastructure equipment according to any one of clauses 52 to 53, wherein the positive response signal is comprised within downlink control information, DCI.

55. Infrastructure equipment according to any one of clauses 42 to 53, wherein the positive response signal is transmitted using a Physical Downlink Shared Channel, PDSCH, radio resource.

56. Infrastructure equipment according to any one of clauses 42 to 55, wherein when the receiver circuitry successfully receives the signal transmitted by the terminal device but the identifying feature of the terminal device was not successfully determined by the identification process, the processor circuitry is configured:
to control the transmitter circuitry to transmit the negative response signal to the terminal device, the negative response signal indicating that the signal transmitted by the terminal device was successfully received but that the identifying feature of the terminal device was not successfully determined by the identification process; and
to control the receiver circuitry to receive a retransmission of the signal transmitted by the terminal device transmitted in response to the negative response signal.

57. Infrastructure equipment according to clause 56, wherein:
the negative response signal has a predetermined characteristic indicative that the identifying feature of the terminal device was not successfully determined.

58. Infrastructure equipment according to clause 57, wherein:
the negative response signal comprises a message comprising, as the predetermined characteristic, a cyclic redundancy check, CRC, code masked with predetermined information.

59. Infrastructure equipment according to clause 57, wherein:
the negative response signal comprises a message comprising, as the negative response signal characteristic, predetermined information.

60. Infrastructure equipment according to any one of clauses 56 to 59, wherein:
the negative response signal is indicative of a combination of a time and a frequency in a radio frame of the radio resource used by the terminal device to transmit the signal; and
(i) the negative response signal has a predetermined characteristic indicative that the identifying feature of the terminal device was not successfully determined or
(ii) the signal transmitted by the terminal device comprises a message from which the identifying feature of the terminal device is determinable.

61. Infrastructure equipment according to any one of clauses 42 to 60, wherein the negative response signal is a hybrid automatic repeat request negative acknowledgement signal, HARQ-NACK.

62. Infrastructure equipment according to any one of clauses 42 to 61, wherein the negative response signal is comprised within downlink control information, DCI.

63. Infrastructure equipment according to clause 62, wherein:
the negative response signal indicates a Physical Uplink Shared Channel (PUSCH) radio resource; and the receiver circuitry is configured to receive a retransmission of the signal transmitted by the terminal device using the PUSCH radio resource indicated by the negative response signal.

64. Infrastructure equipment according to clause 63, wherein:
the negative response signal indicates a radio resource used to transmit the signal in response to which the negative response signal is transmitted.

65. Infrastructure equipment according to clause 63 or 64, wherein:
the negative response signal indicates a plurality of PUSCH radio resources; and
the processor circuitry is configured to control the receiver circuitry to receive a retransmission of the signal transmitted by the terminal device transmitted using any one of the indicated plurality of PUSCH radio resources.

66. Infrastructure equipment according to clause 62, wherein:
the negative response signal indicates a radio resource to be used by the transmitter circuitry to transmit a further response signal to the terminal device, the further response signal indicating to the terminal device to retransmit the signal;
the transmitter circuitry is configured to transmit the further response signal using the radio resource indicated by the negative response signal; and
the receiver circuitry is configured to receive the retransmitted signal from the terminal device.

67. Infrastructure equipment according to clause 66, wherein:
the further response signal indicates to the terminal device to retransmit the signal to the infrastructure equipment via Uplink Early Data Transmission, UL EDT; and
the receiver circuitry is configured to receive the retransmitted signal via UL EDT.

68. Infrastructure equipment according to clause 67, wherein:
the further response signal indicates an UL EDT radio resource; and
the retransmitted signal is transmitted by the terminal device using the indicated UL EDT radio resource.

69. Infrastructure equipment according to clause 67 or 68, wherein:
the further response signal indicates to the terminal device to retransmit the signal after a random delay time period has elapsed; and
the receiver circuitry is configured to receive the retransmitted signal after the random delay time period has elapsed.

70. Infrastructure equipment according to clause 66, wherein:
the further response signal indicates a plurality of PUSCH radio resources; and
the processor circuitry is configured to control the receiver circuitry to receive a retransmission of the signal transmitted by the terminal device transmitted using any one of the indicated plurality of PUSCH radio resources.

71. Infrastructure equipment according to clause 66, wherein:
the further response signal indicates to the terminal device to retransmit the signal to the infrastructure equipment by establishing a Radio Resource Control (RRC) connection with the infrastructure equipment; and
the processor circuitry is configured to control the receiver circuitry to receive the retransmitted signal by establishing a Radio Resource Control (RRC) connection with the terminal device.

72. Infrastructure equipment according to any one of clauses 42 to 55, wherein
when the receiver circuitry does not successfully receive the signal transmitted by the terminal device, the processor circuitry is configured:
to control the transmitter circuitry to transmit to the terminal device, the negative response signal indicating that the signal transmitted by the terminal device was not successfully received by the receiver circuitry; and
to control the receiver circuitry to receive a retransmission of the signal transmitted by the terminal device transmitted in response to the negative response signal.

73. Infrastructure equipment according to clause 72, wherein
the negative response signal indicates one or more radio resources of the predetermined set of radio resources configured for use by the plurality of unidentified terminal devices to transmit signals to the infrastructure equipment for which a signal was not successfully received by the infrastructure equipment.

74. Infrastructure equipment according to clause 73, wherein the negative response signal is comprised within downlink control information, DCI.

75. Infrastructure equipment according to clause 74, wherein the one or more radio resources of the predetermined set of radio resources configured for use by the plurality of unidentified terminal devices to transmit signals to the infrastructure equipment for which a signal was not successfully received by the receiver circuitry is indicated by a bitmap comprised within the DCI, each bit of the bitmap corresponding to a respective radio resource of the predetermined set of radio resources.

76. Infrastructure equipment according to any one of clauses 72 to 75, wherein the receiver circuitry is configured to receive the retransmission of the signal transmitted by the terminal device using a radio resource of the predetermined set of radio resources configured for use by the plurality of unidentified terminal devices to transmit signals to the infrastructure equipment linked to the radio resource used by the terminal device to transmit the signal.

77. A method of operating a terminal device for use in a wireless telecommunications network, the method comprising:
controlling the terminal device to transmit a signal to infrastructure equipment of the wireless telecommunications network using a radio resource of a predetermined set of radio resources configured for use by a plurality of unidentified terminal devices to transmit signals to the infrastructure equipment, an identifying feature of the terminal device being determinable using the signal transmitted to the infrastructure equipment;
controlling the terminal device to receive, from the infrastructure equipment, at least one of:
a positive response signal indicating that the signal transmitted to the infrastructure equipment was successfully received by the infrastructure equipment and that the identifying feature of the terminal device was successfully determined by the infrastructure equipment using the signal transmitted to the infrastructure equipment; and
a negative response signal indicating that the signal transmitted to the infrastructure equipment was not successfully received by the infrastructure equipment or that the identifying feature of the terminal device was not successfully determined by the infrastructure equipment using the signal transmitted to the infrastructure equipment.

78. A method of operating infrastructure equipment for use in a wireless telecommunications network, the method comprising:
controlling the infrastructure equipment to receive a signal from a terminal device of the wireless telecommunications network transmitted using a radio resource of a predetermined set of radio resources configured for use by a plurality of unidentified terminal devices to transmit signals to the infrastructure equipment, an identifying feature of the terminal device being determinable using the received signal;
determining whether or not the signal transmitted by the terminal device was successfully received by the infrastructure equipment, and
if the signal transmitted by the terminal device was successfully received by the infrastructure equipment, to perform an identification process to determine the identifying feature of the terminal device using the received signal and to determine whether or not the identifying feature of the terminal device was successfully identified by the identification process; and
controlling the infrastructure equipment to transmit, to the terminal device, at least one of:
a positive response signal indicating that the signal transmitted by the terminal device was successfully received by the infrastructure equipment and that the identifying feature of the terminal device was successfully determined by the identification process, the positive response signal being transmitted when it is determined that the signal transmitted by the terminal device was successfully received by the infrastructure equipment and that the identifying feature of the terminal device was successfully determined by the identification process; and
a negative response signal indicating that the signal transmitted by the terminal device was not successfully received by the infrastructure equipment or that the identifying feature of the terminal device was not successfully determined by the identification process, the negative response signal being transmitted when the infrastructure equipment determines that the signal transmitted by the terminal device was not successfully received by the infrastructure equipment or that the identifying feature of the terminal device was not successfully determined by the identification process.

79. A program for controlling a computer to perform a method according to clause 77 or 78.

80. A storage medium storing a computer program according to clause 79.

81. Integrated circuitry for a terminal device for use in a wireless telecommunications network, the integrated circuitry comprising:
transmitter circuitry configured to transmit a signal to infrastructure equipment of the wireless telecommunications network using a radio resource of a predetermined set of radio resources configured for use by a plurality of unidentified terminal devices to transmit signals to the infrastructure equipment, an identifying feature of the terminal device being determinable using the signal transmitted to the infrastructure equipment;
receiver circuitry configured to receive, from the infrastructure equipment, at least one of:
a positive response signal indicating that the signal transmitted to the infrastructure equipment was successfully received by the infrastructure equipment and that the identifying feature of the terminal device was successfully determined by the infrastructure equipment using the signal transmitted to the infrastructure equipment; and
a negative response signal indicating that the signal transmitted to the infrastructure equipment was not successfully received by the infrastructure equipment or that the identifying feature of the terminal device was not successfully determined by the infrastructure equipment using the signal transmitted to the infrastructure equipment.

82. Integrated circuitry for infrastructure equipment for use in a wireless telecommunications network, the integrated circuitry comprising:
receiver circuitry configured to receive a signal from a terminal device of the wireless telecommunications network transmitted using a radio resource of a predetermined set of radio resources configured for use by a plurality of unidentified terminal devices to transmit signals to the infrastructure equipment, an identifying feature of the terminal device being determinable using the received signal;
processor circuitry configured:
to determine whether or not the signal transmitted by the terminal device was successfully received by the receiver circuitry, and
if the signal transmitted by the terminal device was successfully received by the receiver circuitry, to perform an identification process to determine the identifying feature of the terminal device using the received signal and to determine whether or not the identifying feature of the terminal device was successfully identified by the identification process; and
transmitter circuitry configured to transmit, to the terminal device, at least one of:
a positive response signal indicating that the signal transmitted by the terminal device was successfully received by the infrastructure equipment and that the identifying feature of the terminal device was successfully determined by the identification process, the positive response signal being transmitted when the processor circuitry determines that the signal transmitted by the terminal device was successfully received by the receiver circuitry and that the identifying feature of the terminal device was successfully determined by the identification process; and
a negative response signal indicating that the signal transmitted by the terminal device was not successfully received by the infrastructure equipment or that the identifying feature of the terminal device was not successfully determined by the identification process, the negative response signal being transmitted when the processor circuitry determines that the signal transmitted by the terminal device was not successfully received by the receiver circuitry or that the identifying feature of the terminal device was not successfully determined by the identification process.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-b 9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] RP-181450, "New WID on Rel-16 MTC enhancements for LTE," Ericsson, 3GPP TSG RAN Meeting #80, La Jolla, USA, Jun. 11-14, 2018.
[6] RP-181451, "New WID on Rel-16 enhancements for NB-IoT," Ericsson, Huawei, 3GPP TSG RAN Meeting #80, La Jolla, USA, Jun. 11-14, 2018.
[7] Holma H. and Toskala A, "LTE for UMTS OFDMA and SC-FDMA based radio access", John Wiley and Sons, 2009.
[8] European Patent Application number EP 18188600.3, Sony Corporation et al.
[9] TS36.212, "Multiplexing and channel coding (Rel-15)" v15.2.1

The invention claimed is:

1. A terminal device, comprising:
transmitter circuitry configured to transmit a signal to infrastructure equipment using a radio resource of a predetermined set of radio resources configured for use by a plurality of unidentified terminal devices to transmit signals to the infrastructure equipment, wherein an identifying feature of the terminal device being determinable using the signal transmitted to the infrastructure equipment;
receiver circuitry configured to receive, from the infrastructure equipment, at least one of a positive response signal and a negative response signal, wherein:
the positive response signal indicates that the signal transmitted to the infrastructure equipment was successfully received by the infrastructure equipment and that the identifying feature of the terminal device was successfully determined by the infrastructure equipment using the signal transmitted to the infrastructure equipment; and
the negative response signal indicates that the signal transmitted to the infrastructure equipment was successfully received by the infrastructure equipment and that the identifying feature of the terminal device was not successfully determined by the infrastructure equipment using the signal transmitted to the infrastructure equipment; and
processor circuitry configured to, in response to reception of the negative response signal by the receiver circuitry, control the transmitter circuitry to retransmit the signal to the infrastructure equipment.

2. The terminal device according to claim 1, wherein the signal transmitted to the infrastructure equipment is transmitted using a Physical Uplink Shared Channel (PUSCH) radio resource.

3. The terminal device according to claim 2, wherein the signal transmitted to the infrastructure equipment is transmitted using a Pre-configured Uplink Resource (PUR) radio resource.

4. The terminal device according to claim 1, wherein the identifying feature of the terminal device comprises a combination of a time and a frequency in a radio frame of the radio resource used to transmit the signal to the infrastructure equipment.

5. The terminal device according to claim 1, wherein the signal transmitted to the infrastructure equipment comprises a message from which the identifying feature of the terminal device is determinable.

6. The terminal device according to claim 5, wherein the message of the signal transmitted to the infrastructure equipment comprises a cyclic redundancy check (CRC) code and the identifying feature of the terminal device comprises a portion of the CRC code.

7. The terminal device according to claim 5, wherein the identifying feature of the terminal device comprises an output of a predetermined hash function applied to the message of the signal transmitted to the infrastructure equipment.

8. The terminal device according to claim 5, wherein the identifying feature of the terminal device comprises a number generated by the terminal device in the message of the signal transmitted to the infrastructure equipment.

9. The terminal device according to claim 1, wherein:
the positive response signal has a characteristic indicative of the identifying feature of the terminal device; and
the terminal device comprises processor circuitry configured to interpret a signal received by the receiver circuitry as a positive response signal when the received signal has the characteristic indicative of the identifying feature of the terminal device.

10. The terminal device according to claim 9, wherein:
the positive response signal comprises a message comprising, as the characteristic indicative of the identifying feature of the terminal device, a cyclic redundancy check (CRC) code masked with information indicative of the identifying feature of the terminal device; and upon the receiver circuitry receiving a signal, the processor circuitry is configured to:
perform a process to retrieve an unmasked CRC code of a message comprised within the received signal using the information indicative of the identifying feature of the terminal device;
perform a cyclic redundancy check on the unmasked CRC code; and
determine the received signal to be the positive response signal if the cyclic redundancy check is successful.

11. The terminal device according to claim 9, wherein:
the positive response signal comprises a message comprising, as the characteristic associated with the identifying feature of the terminal device, information indicative of the identifying feature of the terminal device; and
upon the receiver circuitry receiving a signal, the processor circuitry is configured to determine the received signal to be the positive response signal if a message comprise within the received signal comprises the information indicative of the identifying feature of the terminal device.

12. The terminal device according to claim 1, wherein the positive response signal is a hybrid automatic repeat request acknowledgement signal (HARQ-ACK).

13. The terminal device according to claim 1, wherein the positive response signal is comprised within downlink control information (DCI).

14. The terminal device according to claim 1, wherein the positive response signal is transmitted using a Physical Downlink Shared Channel (PDSCH) radio resource.

15. The terminal device according to claim 1, wherein:
the receiver circuitry is configured to receive the positive response signal from the infrastructure equipment; and
the terminal device comprises processor circuitry configured control the transmitter circuitry to retransmit the signal to the infrastructure equipment if the positive response signal is not received within a predetermined positive response signal time period.

16. The terminal device according to claim 15, wherein the transmitter circuitry is configured to retransmit the signal to the infrastructure equipment via Uplink Early Data Transmission (UL EDT).

17. The terminal device according to claim 15, wherein the terminal device comprises processor circuitry configured to control the transmitter circuitry to retransmit the signal to the infrastructure equipment by establishing a Radio Resource Control (RRC) connection with the infrastructure equipment.

18. Integrated circuitry for a terminal, the integrated circuitry comprising:
transmitter circuitry configured to transmit a signal to infrastructure equipment using a radio resource of a predetermined set of radio resources configured for use by a plurality of unidentified terminal devices to transmit signals to the infrastructure equipment, an identifying feature of the terminal device being determinable using the signal transmitted to the infrastructure equipment;
receiver circuitry configured to receive, from the infrastructure equipment, at least one of a positive response signal and a negative response signal, wherein:
the positive response signal indicates that the signal transmitted to the infrastructure equipment was successfully received by the infrastructure equipment and that the identifying feature of the terminal device was successfully determined by the infrastructure equipment using the signal transmitted to the infrastructure equipment; and
the negative response signal indicates that the signal transmitted to the infrastructure equipment was not successfully received by the infrastructure equipment or that the identifying feature of the terminal device was not successfully determined by the infrastructure equipment using the signal transmitted to the infrastructure equipment; and
processor circuitry configured to, in response to reception of the negative response signal by the receiver circuitry, contorl the transmitter circuitry to retransmit the signal to the infrastructure equipment.

19. Integrated circuitry for infrastructure equipment, the integrated circuitry comprising:
receiver circuitry configured to receive a signal from a terminal device transmitted using a radio resource of a predetermined set of radio resources configured for use by a plurality of unidentified terminal devices to transmit signals to the infrastructure equipment;
processor circuitry configured to:
determine whether or not the signal transmitted by the terminal device was successfully received by the receiver circuitry; and
in a case that the signal transmitted by the terminal device is determined to have been successfully received by the receiver circuitry:
perform an identification process to determine an identifying feature of the terminal device using the received signal; and
determine whether or not the identifying feature of the terminal device was successfully identified by the identification process; and
transmitter circuitry configured to transmit, to the terminal device, at least one of: a positive response signal and a negative response signal, wherein
the positive response signal indicates that the signal transmitted by the terminal device was successfully received by the infrastructure equipment and that the identifying feature of the terminal device was successfully determined by the identification process, the positive response signal being transmitted when the processor circuitry determines that the signal transmitted by the terminal device was successfully received by the receiver circuitry and that the identifying feature of the terminal device was successfully determined by the identification process,
the negative response signal indicates that the signal transmitted by the terminal device was not successfully received by the infrastructure equipment and that the identifying feature of the terminal device was not successfully determined by the identification process, the negative response signal being transmitted when the processor circuitry determines that the signal transmitted by the terminal device was successfully received by the receiver circuitry or that the identifying feature of the terminal device was not successfully determined by the identification process, and
the processor circuitry is further configured to, in response to transmission of the negative response signal by the transmitter circuitry, control the receiver circuitry to receive a retransmission of the signal from the terminal device.

* * * * *